United States Patent [19]

Haeussermann

[11] 4,093,917
[45] June 6, 1978

[54] VELOCITY MEASUREMENT SYSTEM

[75] Inventor: Walter Haeussermann, Huntsville, Ala.

[73] Assignee: The United States of America as represented by the Administrator, National Aeronautics and Space Administration, Washington, D.C.

[21] Appl. No.: 730,046

[22] Filed: Oct. 6, 1976

[51] Int. Cl.² .................................................. G01P 3/48
[52] U.S. Cl. .......................................... 324/173; 324/207
[58] Field of Search .................. 324/173, 45, 34 PS, 324/34 D; 73/519, 520

[56] References Cited
U.S. PATENT DOCUMENTS

| 3,243,692 | 3/1966 | Heissmeier et al. | 324/45 X |
| 3,513,386 | 5/1970 | Walraven | 324/45 X |
| 3,932,813 | 1/1976 | Gallant | 324/173 |

OTHER PUBLICATIONS

Analog No-Contact Transducer by J. H. Meier, IBM Tech. Discl. Bull., vol. 17, No. 11, Apr. 1975, pp. 3250-3251.

Primary Examiner—Rudolph V. Rolinec
Assistant Examiner—Vincent J. Sunderdick
Attorney, Agent, or Firm—George J. Porter; John R. Manning; L. D. Wofford, Jr.

[57] ABSTRACT

A velocity sensor for sensing the speed of a moving conductive body employing an E-shaped magnetic core having a pair of spaced Hall effect devices positioned on the end of the central core, the ends of all cores being arranged adjacent to the path of the moving conductive body. The difference in output voltage registered by the two Hall effect devices is indicative of the speed of the conductive body.

6 Claims, 6 Drawing Figures

VELOCITY MEASUREMENT SYSTEM

ORIGIN OF THE INVENTION

The invention described herein was made by an employee of the United States Government, and may be manufactured and used by or for the Government of the United States for governmental purposes without the payment of any royalties thereon or therefor.

BACKGROUND OF THE INVENTION

1. Field of the Invention

This invention relates to speed measurements devices, and particularly to an apparatus employing magnetic means for analog measurement of the speed of an electrically conductive body, either of solid or liquid substance.

2. General Description of the Prior Art

Most known magnetic speed measuring devices are based upon eddy current effects, either changing the magnetic flux directly or by causing changes in a secondary flux path. The difficulty in the past with such devices has been that their efficiency, or signal vs. exitation energy, has been poor and that their signal linearity has generally been unsatisfactory.

Accordingly, it is an object of this invention to provide an improved magnetic type speed sensor with a good efficiency and satisfactory signal linearity which may be combined with magnetic bearings. A further object of this invention is to provide a device which permits the measurement of speed components without cross coupling effects as between components.

SUMMARY OF THE INVENTION

In accordance with this invention, an E-shaped magnetic core is positioned with its three poles closely spaced from a conductive body, the speed of which is to be monitored. A pair of Hall effect devices or generators are positioned on the surface of the end of the central pole, these generators being significantly spaced, preferably spaced a maximum distance measured along the line of movement of the body to be monitored in speed. Thus, the Hall generators are positioned where the flux density shows its greatest change resulting from the velocity of the conductive body and at points of greatest difference in flux. This difference is thus sensed by the Hall generators, and from it the speed of the body is indicated.

As a feature of this invention, means are provided to maintain a constant total flux through the magnetic circuit involved by varying an electrical input to an energizing coil supplying magnetic bias to the E-shaped magnetic core. The invention is adaptable for use for measuring the speed of bodies which are simply electrically conductive, as well as being both conductive and having a magnetic property. Further, speed components may be measured in two or more directions, it being simply necessary to orient the magnetic core or cores with Hall effect generators positioned along a line which speed or a speed component is to be measured.

Still further, this invention may solely be a discrete measurement device, or it may be combined with other magnetic circuitry, such as that of a magnetic bearing or bearings.

BRIEF DESCRIPTION OF THE DRAWINGS

FIG. 1b is a series of curves illustrating flux distribution resulting from the configuration shown in FIG. 1a.

DETAILED DESCRIPTION OF THE DRAWINGS

Figure 1A:
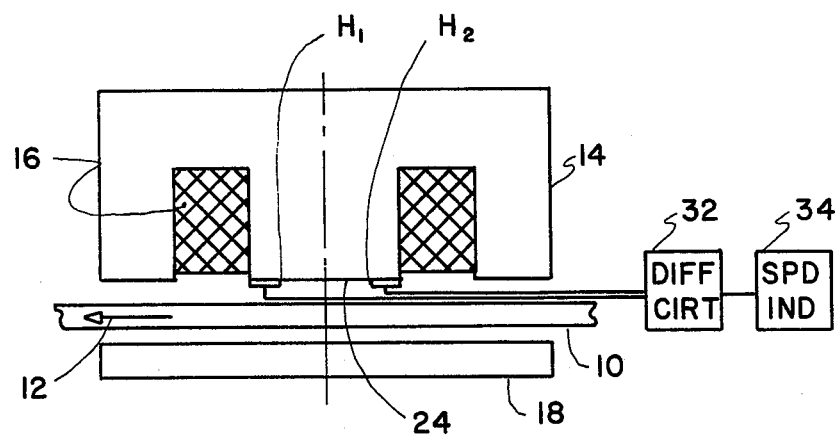
FIG. 1a is a schematic illustration of the basic concept of this invention.

Referring first to FIG. 1a, there is shown a basic illustration of this invention as employed to measure the speed of a moving body 10, moving in the direction of arrow 12. An E-shaped magnetic core 14 is energized by a winding 16 which is powered by means not shown. Typically, the power supply would be a direct current power supply. Moving body 10 is closely positioned between E core 14 and a yoke of magnetic material 18, the spacing between the core and moving body and the yoke and moving body typically being approximately one millimeter. Moving body 10 would either be of a conductive material or have a conductive surface on it. Hall effect generators $H_1$ and $H_2$ are positioned, as shown, on the phase of center leg 24 of E core 14, Hall generator $H_1$ being positioned on what may be deemed the trailing flux edge of center core 24, and Hall generator $H_2$ being positioned on what may be deemed the leading flux edge of center core 24, considering the direction of movement of moving body 10. Yoke 18 functions to provide increased flux path for greater signal output of the system, but it is not absolutely necessary for operation.

Figure 1B:
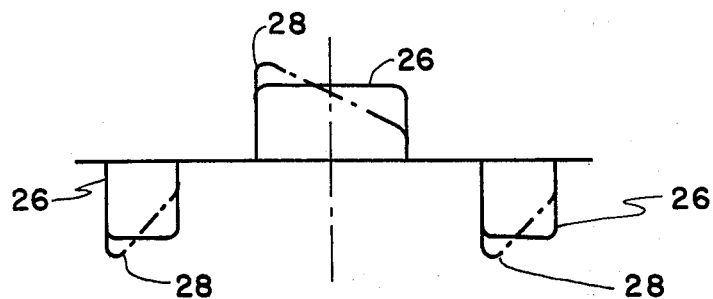

FIG. 1b is positioned under FIG. 1a to illustrate the magnetic flux density across the circuit of the device shown in FIG. 1a, and particularly to illustrate the magnetic flux density under the poles of the E-shaped magnetic core 14. Solid line 26 represents the magnetic induction when moving body 10 is at rest, and dashed line 28 represents the induction distribution occurring for a selected velocity of moving body 10. Thus, it will be noted that in accordance with this invention, Hall effect generators $H_1$ and $H_2$ are placed at the position of maximum flux density variation to obtain maximum sensitivity of the measuring arrangement.

Hall generators $H_1$ and $H_2$ are appropriately biased by a direct current source in a conventional manner, and their outputs are applied to difference circuit 32, such as a bridge, and its output, appropriately scaled, is applied to indicator 34 which displays or otherwise provides an indication of the speed of movement of body 10.

Figure 2:
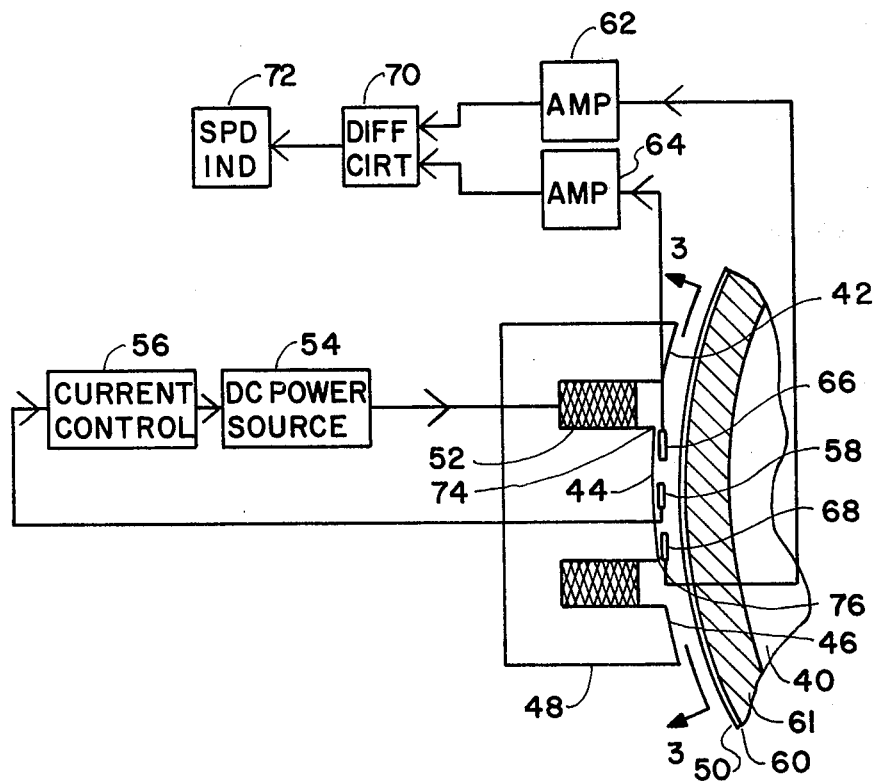
FIG. 2 is a schematic illustration of a form of this invention adapted to measure the surface speed of a circular or spherical body.
Figure 3:
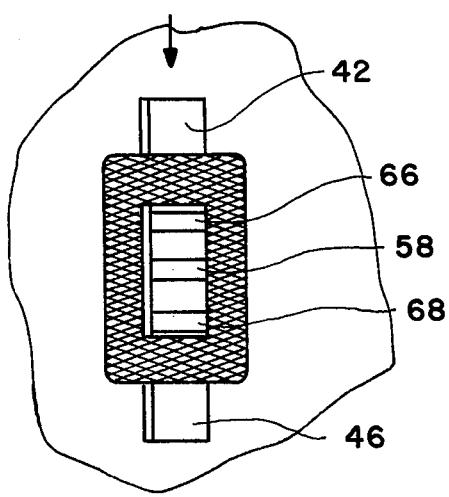
FIG. 3 is a view of the magnetic core structure shown in FIG. 2 as seen when viewing the structure normal to the pole faces.

FIGS. 2 and 3 illustrate an embodiment of this invention as applied to the measurement of the speed of sphere 40, and the basic theory of operation of this invention will be explained with respect to these figures.

As shown, pole faces 42, 44, and 46 of E core 48 are curved to conform with that of the outer surface 50 of sphere 40. DC exitation is provided coil 52 from DC current source 54, controlled by current control 56, in turn responsive to flux sensed by Hall effect generator 58, positioned in the center of the face of center pole 44. Current is thus controlled to maintain a constant flux in the magnetic circuit through center pole 44.

Since it is normally not possible in such a system to employ a fixed magnetic yoke, the surface region of sphere 40 would typically be constructed of an outer layer 60 which is of a good electrical conductive material formed over layer 61, which is of a good magnetic material. Alternately, a single layer having both of these properties may be employed. As another alternate, the surface region may simply be of a conductive material, and signal amplifiers 62 and 64 are employed as shown to appropriately amplify the outputs of Hall generators 66 and 68. The outputs of amplifiers 62 and 64 are applied to and subtracted by difference circuit 70, and the resulting signal, which is proportional to velocity, is indicated by indicator 72.

To examine the operation of the system, voltages induced by the magnetic field on the rotating sphere cause electric currents to flow in the conducting surface of the sphere. These currents are oriented in such a way that they oppose magnetic flux change. The result is a decrease in magnetic flux density as seen from the rotating sphere at the leading or on-coming edge 74 of center pole 44, and an increase in flux density on its trailing or leaving edge 76. The difference in flux densities measured by Hall generators 66 and 68 is a first approximation proportional to the speed component of the sphere in the plane of the Hall generators.

A simplified analysis of the properties of the system follows:

The magnetic flux density B under the center pole of E-shaped core 48 is:

$$B = (AT_1 - AT_2) p \quad (1)$$

where $p$ is the permeance of a magnetic flux tube of the magnetic flux, $AT_1$ are the magnetization ampere turns of winding 16, and $AT_2$ are the ampere turns produced by the moving armature 10, opposing the ampere turns $AT_1$ in the magnetic flux tube under consideration. The voltage in moving armature 10 under core 48 is for a closed electrical circuit given by the proportionality $$e \approx B \times v \quad (2)$$

where $v$ is the speed of armature 10. The resulting current in the armature, caused by voltage $e$, is $$i = e/r \quad (3)$$

where $r$ is the resistance of the current path in the armature. Substituting equations (1) and (2) in (3) shows the relationship $$i \approx \frac{p}{r} (AT_1 - AT_2) v \quad (4)$$

The armature ampere turns $AT_2$ acting on the flux tube under consideration are proportional to the armature currents; thus, with equation (4), it follows that $$AT_2 = k \frac{p}{r} (AT_1 - AT_2) v \quad (5)$$

or resolving this equation for $AT_2$, one obtains $$AT_2 = \frac{1}{\frac{r}{kp} + v} AT_1 v. \quad (6)$$

Since $AT_2$ causes the change in flux density $\Delta B$ at the measuring points of the Hall generators as shown with equation (1), this flux change is $$\Delta B = AT_2 \times p,$$

and with equation (5):

$$\Delta B = \frac{p}{\frac{r}{kp} + v} AT_1 v. \quad (7)$$

The difference of the signals from the two Hall generators is within the linearity of the Hall generators proportional to the change in flux density. Thus, with a gain factor $g$ in the sensing loop of the Hall generators and amplifiers, the measured signal is $$S = g \frac{p}{\frac{r}{kp} + v} AT_1 v. \quad (8)$$

This equation shows that the signal S is proportional to the armature velocity $v$ if $v << r/kp$. For larger velocities, the signal reaches a saturation value. The non-linearity can be reduced by designing $$r/kp >> v \quad (9)$$

Of the three parameters $k$, $r$, and $p$, $k$ is a proportionality value (equation (5)) which cannot be changed very much, whereas $r$ and $p$ can be modified by proper design. Selection of a high resistance of the current path in the armature and of a low permeance, e.g., by a larger air path for the magnetic flux, are helpful. The subsequent loss in signal strength as evident from equation (8) can be compensated for by a sufficiently high gain factor $g$ as well as by a higher magnetization of the E-shaped core.

The results demonstrated by equations (8) and (9) are quite evident if one considers that the non-linearity effect is caused by ampere turns in armature 10 which reduces the effect of exitation ampere turns provided by winding 16. Thus, the smaller the sensor signal the smaller will be the non-linear effect, and the more amplification which will be necessary to obtain a desired signal strength. In most instances, sufficient amplification at an acceptable noise figure can be obtained.

The non-linearity inherent in the electromagnetic subsystem can be compensated for by control of the magnetic flux to a constant value by the technique illustrated, that is, by controlling the energizing current to coil 52 by means of current control 56, in turn controlled by auxiliary Hall generator 58. The latter provides a control signal indicative of the magnitude of flux through E-shaped core 48, whereby, by means of conventional techniques, current control 56 controls power source 54 to provide a current input to winding 16 to maintain a constant flux.

Figure 4:
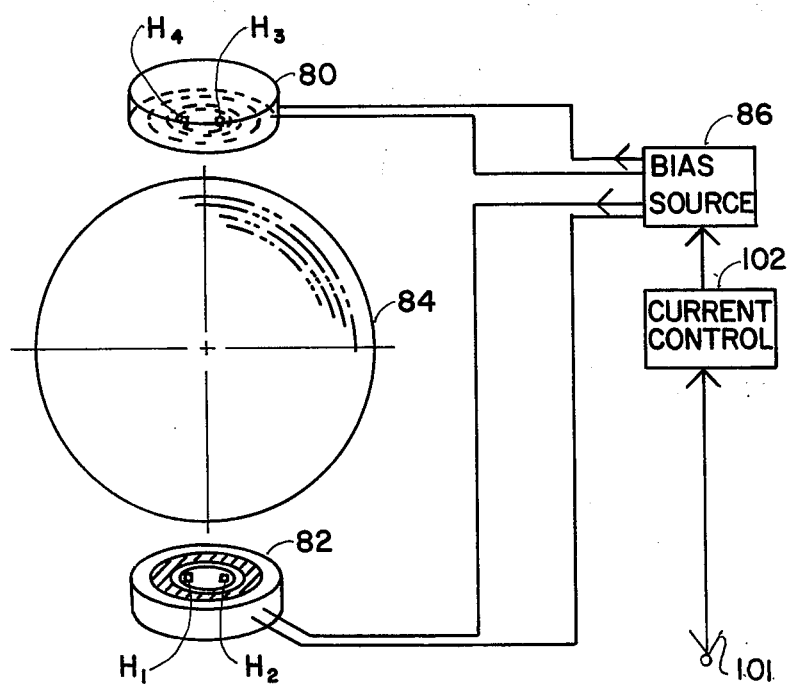
FIG. 4 is a schematic illustration of a magnetic support for a rotating spherical body.
Figure 5:
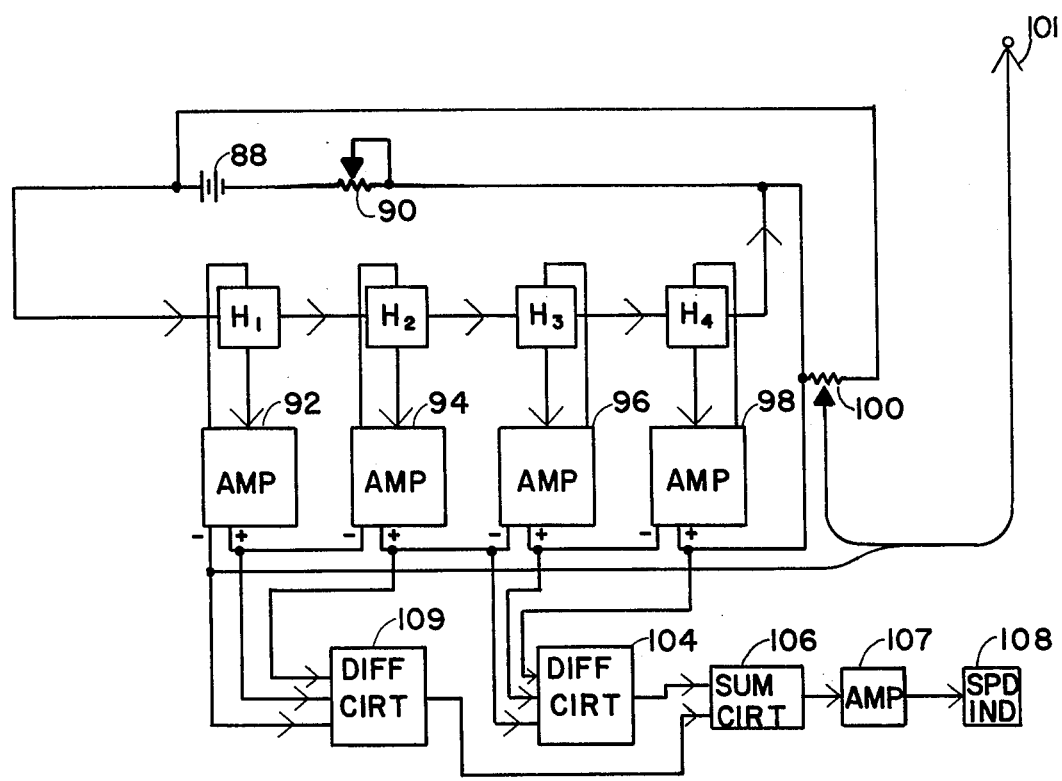
FIG. 5 is a schematic illustration of a speed sensing system as contemplated by this invention.

FIGS. 4 and 5 illustrate the employment of this invention with magnetic bearings 80 and 82, which have an E-shaped cross section and which are adapted to magnetically support and position sphere 84 without any physical bearing surface. An example of such a system of support is shown in U.S. Pat. No. 3,017,777 previously issued to the applicant. The cores of magnetic bearings 80 and 82 are controlled by means of bias source 86, typically a differential type source supplying current differentially to the magnetic bearings. As will be further explained, means are provided to assure that the sum of the magnetic fluxes to the bearings is held constant in order to assure accuracy of the measurement system of this invention. As will be noted in FIG. 4, Hall effect generators $H_1$ and $H_2$ are positioned on extreme edges of the center pole of magnetic bearing 82, this being with respect to the direction of measurement of rotation of sphere 40. Similarly, Hall effect generators $H_3$ and $H_4$ are so positioned on the center pole of magnetic bearing 80.

Referring particularly to FIG. 5, it will be noted that the Hall generators are biased, in series, by means of power source 88 and series variable resistor 90, by which the bias current to the Hall generators may be adjusted. The current output of each Hall generator is fed to one of amplifiers 92, 94, 96, and 98. The sum of the outputs of these amplifiers are added by connecting them in series, and thus there is provided a sum signal which is appropriately labelled as $(H_1 + H_2) + (H_3 + H_4)$, from which is subtracted a reference voltage obtained from voltage divider 100, in turn powered from power supply 88 furnishing biasing power to the Hall generators. By adjustment of this voltage divider, an output is obtained which is adjusted to be 0 for a condition of a selected flux sum detected by the Hall effect devices. This selected state would typically be a selected operating flux state for the magnetic bearings. In order to maintain accuracy and calibration of speed indication, it is desirable that this value of total flux be maintained. Thus, the selected output achieved by adjustment of voltage divider 100 as aforesaid is fed to terminal 101 (FIG. 5) and from terminal 101 (FIG. 4) to current control 102, and it in turn controls the total current output of bias source 86, which supplies power to magnetic bearings 80 and 82. Typically, bias source 86 would differentially apply a current to magnetic bearings 80 and 82. Discrete outputs of amplifiers 92 and 94 are subtracted in difference circuit 109, and the discrete outputs of amplifiers 96 and 98 are subtracted in difference circuit 104, and the thus obtained difference signals are summed in sum circuit 106 to provide a signal representative of $(H_1 - H_2) + (H_3 - H_4)$. This signal obtained from the Hall generators in both magnetic bearings 80 and 82 is proportional to the speed of movement of sphere 80 along a line corresponding to a plane intersecting the Hall generators. After proper amplification in amplifier 107, the signal is fed to speed indicator 108, which provides a display or other indication of speed.

Having thus described my invention, what is claimed is:

1. A velocity sensor for measuring the surface speed of a conductive body along a path of movement comprising:
    an E-shaped magnetic core having a central pole and two spaced outer poles, the ends of said poles being configured to be closely spaced from the conductive surface of a moving body the speed of which is to be measured, said poles being positioned, in line, along said path of movement of said body;
    an energizing coil coupled to said central pole;
    first and second Hall effect devices positioned in a spaced relation along said path of movement of said body on the end surface of said central pole of said core, and each said Hall effect device having a bias input and signal output;
    bias means for applying a biasing current to said energizing coil and to the bias input of said Hall effect devices; and
    difference means connected to the signal outputs of said Hall effect devices for subtracting the signal outputs and providing a signal indicative of the velocity of a conductive body moving across but spaced from the end surfaces of said poles and said Hall effect devices.

2. The combination as set forth in claim 1 wherein:
    said sensor further comprises a third Hall effect device centrally positioned on the end surface of the central pole of said core; and
    said biasing means for applying a biasing current to said energizing coil includes current control means responsive to the output of said third Hall effect device for maintaining a constant flux through said central pole of said core.

3. A velocity sensor as set forth in claim 2 further comprising means for amplifying the outputs of said first and second Hall effect devices, and indicating means responsive to the output of said difference means for indicating the velocity of a conductive body.

4. A velocity sensor for measuring the surface speed of a conductive body along a path of movement comprising:
    first and second oppositely positioned E-shaped magnetic cores adapted and positioned to magnetically support a rotating circular body between said cores, and each said core having central and outer spaced poles, all positioned in a line along a path of movement of said body;
    first and second Hall effect devices positioned in a spaced relation on the ends of the central pole of said first magnetic core, and third and fourth Hall effect devices positioned in a spaced relation on the end surface of the central pole of said second magnetic core;
    said first and third Hall effect devices being positioned diametrically opposite on opposite sides of said body, and said second and fourth Hall effect devices being positioned diametrically opposite on opposite sides of said body;
    a first energizing coil coupled to said first magnetic core, and a second energizing coil coupled to said second magnetic core;
    biasing means for applying a biasing current to said Hall effect devices and to said energizing coil; and
    indicating means responsive to the output of said Hall effect devices for indicating the velocity of rotation of said body.

5. A velocity sensor as set forth in claim 4 further comprising amplification means for amplifying the outputs of each of said Hall effect devices.

6. A velocity sensor as set forth in claim 5 further comprising:
    summing means connected to said Hall effect devices for providing, as an output, a signal proportional to the sum of the outputs of said Hall effect devices;
    reference signal means connected to the output of said summing means for providing an output signal which is zero for a selected sum of the fluxes of said E-shaped magnetic cores; and
    current supply means responsive to said reference signal means for supplying current to said first and second energizing coils of a level which maintains a constant total flux in said first and second magnetic cores.

* * * * *